Patented July 12, 1932

1,866,698

UNITED STATES PATENT OFFICE

RUWIN BRONSZTAJN, OF NEWARK, NEW JERSEY

METHOD OF EXTRACTING VEGETABLE PROTEINS AND PRODUCT OBTAINED THEREBY

No Drawing. Application filed October 22, 1930, Serial No. 490,554. Renewed December 2, 1931.

This invention relates to an improved method of extracting proteins from vegetable material and to the product so obtained, and has particular reference to the extraction of proteins from the seed of castor-oil plants, nuts, and lupine seed.

The present application is a continuation in part of my co-pending application, Serial No. 459,831, filed June 7, 1930.

In the preferred manner of carrying out the invention, a substantially oil-free flour derived from a vegetable material, such as certain kinds of nuts, lupine seed, or the seed of castor-oil plants, is mixed with water and is then treated with an etiolating or bleaching agent. As the etiolating agent I may use sodium sulphite, sodium bisulphite, sodium sulphate, sodium bisulphate, the corresponding salts of potassium and ammonium, and other substances having a greater or less bleaching action, but I prefer to employ sodium bisulphite because of its non-solvent action on proteins. In general, for high efficiency, a bleaching agent should be employed which is of such character and can be used in such quantity that it does not dissolve out any appreciable amount of the proteins, as any proteins so dissolved, or at least a large part thereof, remain permanently in solution or suspension and are not precipitated by the subsequent treatment with acid described hereinbelow.

After the vegetable material has been left in suspension in the bleaching solution long enough to complete the bleaching action, there is added, for extraction purposes, an alkaline solution, such as ammonia and water, or caustic soda and water, and the whole is then mechanically mixed for a prolonged period. This solution is then preferably filtered and, upon subsequent addition, in known manner, of an acid such as a mineral acid or acetic acid, the proteins are precipitated and thereafter reduced to powder form by drying the same with the application of heat. The vegetable residue after the filtering step can be mixed with a quantity of sodium hydroxide and water and, upon filtering this solution, additional proteins may be deposited by the use of an acid, as above suggested.

As a specific example of the method, 100 grams of flour obtained from the seed of the caster-oil plant, or from nuts or lupine seed, after the oil contained therein has been extracted in any suitable manner, are placed in a solution of 0.3 to 0.5 grams of sodium bisulphite in 700 to 800 grams of water and left in suspension therein for about 4 hours, the solution being preferably not considerably above room temperature. An alkaline solution of, for example, 0.5 of a gram of ammonia and 1 cubic centimeter of water may then be added to the above mixture and stirred mechanically for approximately 14 hours in the cold, i. e. not considerably above room temperature. After filtering this mixture, a suitable quantity of an acid, such as a mineral acid, e. g. sulphuric or hydrochloric acid, or an organic acid, such as acetic acid, which may be in the form of vinegar, is added to the filtered portion thereof and the proteins thus precipitated. An additional quantity of proteins may be obtained by adding to the vegetable residue of the filtration a mixture consisting of 600 grams of water and 0.2 grams of soda, or, as suggested above, ammonia or sodium hydroxide, and then agitating this second solution for about 10 hours. Following this, the solution is filtered and otherwise treated in the same manner as described in connection with the first solution from which the proteins were precipitated. The proteins thus obtained are subjected to a temperature between 35° and 40° C. to dry the same and reduce them to powder form.

The alkaline solution employed to dissolve out and extract the protein materials from the vegetable substances may comprise the aqueous solution of an hydroxide, carbonate or bicarbonate of an alkali metal (sodium, potassium, and ammonium). I have found the hydroxides to give the best results.

The sodium sulphite preferably employed in my improved process acts as an etiolating agent and at the same time operates to disintegrate the vegetable cells and thus makes the protein content of the raw material more accessible to the solvent action of the alkali solution subsequently employed. The sulphite also acts as a disinfectant and preservative, the product obtained according to my process being characterized by great durability and stability as it possesses high resistance against fermentation, putrefaction and molding. The product obtained by my improved process is also soluble and digestible, and contains globulin and glutens including glutelin.

By means of my improved process I am able to extract as much as 85%, and sometimes even more, of the protein matter contained in the vegetable material. The product obtained by me contains not only the albumens and glutens, but also peptones, conglutin, and the more soluble albumens, which last-mentioned substances are either lost or rendered indigestible, insoluble and inert through coagulation in the known extraction processes. My improved product is suitable for use for the manufacture of glue, dyes, paints, galalith, films for photographic purposes, and other industrial uses to which protein material has been put. In particular, the product obtained by me is highly suitable for baking purposes, as it can readily be beaten up and remains in such condition for as much as 24 hours; moreover, after being beaten up, it can remain at room temperature for as much as eight days without putrefying or developing an unpleasant taste so that a large quantity can be beaten up at one time and used from day to day after being slightly re-beaten. My product is low in starch content and thus makes an excellent food for diabetics.

My novel product has also the advantage over the protein materials hitherto employed for the manufacture of glue in that, whereas protein substances as hitherto prepared all have to be heated when made up into glue, my improved product can be made into glue by simply dissolving the same in the cold with water glass, ammonia, and other known substances employed for such purposes.

My improved process should preferably be carried out in the cold; that is, at temperatures at which substantially none of the proteins will be coagulated. My experience has shown that when temperatures appreciably above room temperature are employed, as when warm water of about 30° C. or above is used, the more soluble proteins are lost, and the product and yield obtained is inferior to that described herein. In fact, I have found that for best results the temperature of the various reagents employed by me should be below room temperature, a temperature of about 10° C. being satisfactory.

It will be understood that while I prefer to employ nuts, lupine seeds, or the seed of castor-oil plants, after the oil contained therein has been extracted, as the raw material, other vegetable substances, preferably oil-free, may also be utilized.

What is claimed is:

1. The method of extracting proteins from vegetable material, which comprises treating the material in the cold first with an etiolating agent of such character and in such amount as not to dissolve out an appreciable quantity of proteins and then with a solution of a basic compound of an alkali metal to extract the proteins from such material, and subsequently acidifying the solution to precipitate the proteins.

2. The method of extracting proteins from vegetable material, which comprises treating the material first with a sodium bisulphite solution in an amount insufficient to dissolve out an appreciable quantity of proteins and then with a solution of a basic compound of an alkali metal to extract the proteins from such material, and subsequently acidifying the solution to precipitate the proteins.

3. The method of extracting proteins from vegetable material included within the group of vegetable substances consisting of the seeds of castor-oil plants, lupine seed, and nuts, which comprises treating the material in the cold first with an etiolating agent of such character and in such amount as not to dissolve out an appreciable quantity of proteins and then with a solution of a basic compound of an alkali metal to extract the proteins from such material, and subsequently acidifying the solution to precipitate the proteins.

4. The method of extracting proteins from vegetable material included within the group of vegetable substances consisting of the seeds of castor-oil plants, lupine seed, and nuts, which comprises treating the material first with sodium bisulphite solution in an amount insufficient to dissolve out an appreciable quantity of proteins and then with a solution of a basic compound of an alkali metal to extract the proteins from such material, and subsequently acidifying the solution to precipitate the proteins.

5. The method of extracting proteins from vegetable material included within the group of vegetable substances consisting of the seeds of castor-oil plants, lupine seed, and nuts, which comprises comminuting the material, treating the same with sodium bisulphite solution in an amount insufficient to dissolve out an appreciable quantity of proteins, subjecting the material to the dissolving action of a solution of a basic compound of an alkali metal to extract the proteins from such material, filtering the mixture, acidifying the filtrate to precipitate the proteins, separating the proteins and drying the same.

6. The method of extracting proteins from vegetable material, which comprises treating the material with approximately 0.3% to 0.5% thereof by weight of sodium bisulphite in aqueous solution, adding to the mixture an hydroxide of an alkali metal in an amount approximately 0.5% of the weight of such vegetable material to dissolve out the protein substances, and subsequently acidifying the solution to precipitate the proteins.

7. The method of extracting proteins from vegetable material, which comprises treating the material in the cold first with a sodium bisulphite solution in an amount insufficient to dissolve out an appreciable quantity of proteins and then with a solution of a basic compound of an alkali metal to extract the proteins from such material, and subsequently acidifying the solution to precipitate the proteins.

8. The method of extracting proteins from vegetable material included within the group of vegetable substances consisting of the seeds of castor-oil plants, lupine seed, and nuts, which comprises treating the material in the cold first with sodium bisulphite solution in an amount insufficient to dissolve out an appreciable quantity of proteins and then with a solution of a basic compound of an alkali metal to extract the proteins from such material, and subsequently acidifying the solution to precipitate the proteins.

9. The method of extracting proteins from vegetable material included within the group of vegetable substances consisting of the seeds of castor-oil plants, lupine seed, and nuts, which comprises comminuting the material, treating the same in the cold with sodium bisulphite solution in an amount insufficient to dissolve out an appreciable quantity of proteins, subjecting the material to the dissolving action of a solution of a basic compound of an alkali metal to extract the proteins from such material, filtering the mixture, acidifying the filtrate to precipitate the proteins, separating the proteins and drying the same.

10. The method of extracting proteins from vegetable material, which comprises treating the material in the cold with approximately 0.3% to 0.5% thereof by weight of sodium bisulphite in aqueous solution, adding to the mixture an hydroxide of an alkali metal in an amount approximately 0.5% of the weight of such vegetable material to dissolve out the protein substances, and subsequently acidifying the solution to precipitate the proteins.

11. As a new composition of matter, a substantially white, soluble, digestible, protein extract of vegetable origin containing at least in large part the albumens, glutens, conglutins, globulins, and peptones present in the parent vegetable material, capable of being beaten into a froth, and in such disinfected and stable condition as to be capable of remaining at room temperature, after being beaten, for approximately eight days without putrefying, said extract being soluble in the cold in vegetable glue solvents.

12. The method of extracting proteins from vegetable material, which comprises treating the material first with an etiolating agent of such character and in such amount as not to dissolve out an appreciable quantity of proteins and then with a solution of a basic compound of an alkali metal to extract the proteins from such material, and subsequently acidifying the solution to precipitate the proteins.

In testimony whereof, I have affixed my signature.

RUWIN BRONSZTAJN.